Feb. 27, 1940.    F. STAHL    2,191,998
ARRANGEMENT FOR FIXING HANDLES OF STEEL TUBE
IN FORKS, SPADES, OR OTHER IMPLEMENTS
Filed Dec. 6, 1938
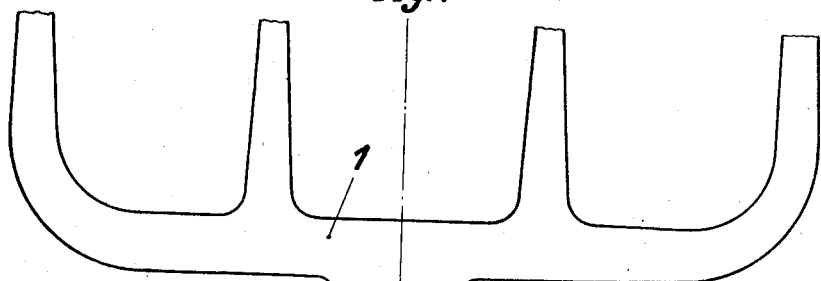
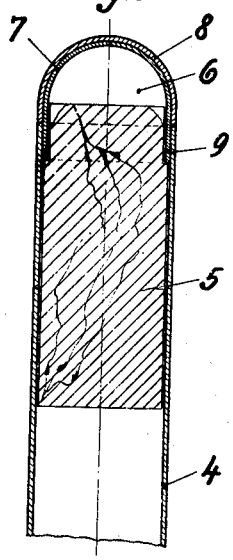
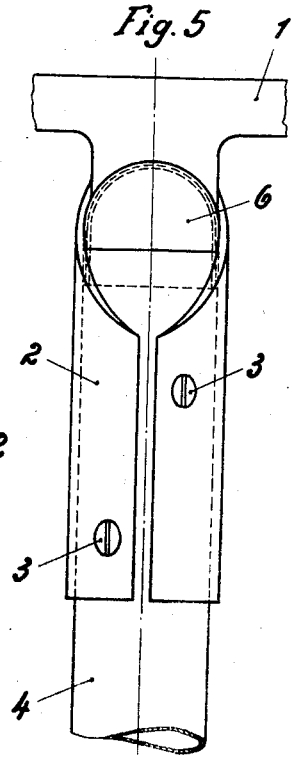
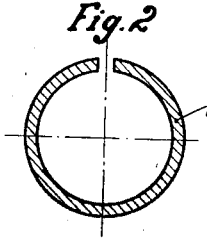
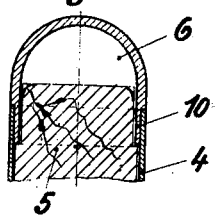
Inventor:
FRIEDRICH STAHL
By *[signature]*
Attorney Patented Feb. 27, 1940

2,191,998

UNITED STATES PATENT OFFICE 2,191,998

ARRANGEMENT FOR FIXING HANDLES OF STEEL TUBE IN FORKS, SPADES, OR OTHER IMPLEMENTS

Friedrich Stahl, Werdohl, Germany, assignor to Stahlwerke Brüninghaus Aktiengesellschaft, Werdohl in Westphalia, Germany Application December 6, 1938, Serial No. 244,166
In Germany January 25, 1937

1 Claim. (Cl. 306—21)

As handles for utensils necessary in farming or industry such as forks, spades or the like, wooden handles were chiefly used which are driven into a closed socket fixed on the implement, the handle being then secured in its position by a nail. The inconveniences of the employment of wooden handles and the fixation of the handles in the utensil by means of nails are generally known.

To avoid these inconveniences it has been proposed to make the handle of steel tube and to connect the handle with the utensil by pressing the socket of the utensil into the steel tube and by then welding together the tube and the transverse part of the utensil. This fixation of a handle of steel tube on the utensil possesses the inconvenience that the working pieces such as the prong of a fork distort easily at the welding of the handle with the transverse part of the utensil. When a utensil becomes unfit for use a steel tube handle fixed by welding cannot be removed without becoming useless, so that it has to be thrown away with the utensil.

It is further known to fix steel tube handles in utensils by introducing the handle end, which has been slit, into the utensil and to then drive into the end of the steel tube a wooden plug so that the slit end of the steel tube is spread. This kind of fixation means loss of time caused by the slitting of the end of the steel tube and the fixation is also not very durable as the handle may get loose owing to the strong stressing of the utensil.

This invention relates to an arrangement for the simple and secure fixation of steel tube handles in forks, spades or similar utensils, without any of the above stated inconveniences, and so that the handles can be removed from the utensil and be used again if desired.

The invention consists therein that the steel tube which has to serve as handle is closed at the end to be fixed by a wooden plug with closing cap and then driven into the socket on the utensil and connected with the socket by wood screws.

An embodiment of the invention is illustrated by way of example in the accompanying drawing in which:

Fib. 1 shows a fork with open socket destined to receive the handle of steel tube;

Fig. 2 shows a section through the open socket;

Fig. 3 the end of the handle of steel tube with closing cap fitted thereover and containing the wooden plug;

Fig. 4 a similar view as Fig. 3, the closing cap being of modified construction and Fig 5 the utensil with the inserted and fixed handle of steel tube.

1 designates the utensil, in the example shown a fork with prongs, and 2 the socket on the fork destined to receive the handle, the socket, which is open consists in known manner, of two rolled flaps for tightly and resiliently gripping the handle and having a slightly shorter diameter than the external diameter of the steel tube handle. A steel tube 4 serves as a handle and is closed, at the end to be fixed on the fork, by a closing cap 6 in which a wooden plug 5 of approximately the same length as the socket 2 is inserted (Fig. 3). The closing cap 6 consists preferably of an inner sheet metal cap 7 with wooden plug 5 and of an outer sheet metal cap 8 which is tightly pressed over and shorter than the cap 7, so that when the projecting end 9 of the cap is forced in, the cap 8 comes to bear against the end face of the sheet steel tube 4 and thereby, on the one hand, limits the forcing in of cap 7 with wooden plug 5 and, on the other hand, prevents moisture from penetrating into the interior of the sheet steel tube. Instead of the double sheet metal cap, the closing cap 6 may consist of one piece, its end having a flange 10, by means of which it bears against the end face of the sheet steel tube 4 when the cap is driven into the same (Fig. 4).

The end of the sheet steel tube closed in this manner is forced into the socket 2 of the utensil and then secured in this position by means of wood screws 3 screwed into the wooden plug 5, for which purpose holes are bored through the socket 2 and the sheet steel tube 4 after the handle of sheet steel tube has been inserted in the socket.

If, for any reason whatsoever, for instance when a prong of the fork has been broken off, the sheet steel handle has to be detached from the utensil, it is only necessary to unscrew the wood screws 3, when the utensil can be pushed off the handle, as is customary when wooden handles are used. The new fixation presents the advantage that handle and utensil can be easily separated as soon as this is desirable, none of the parts becoming thereby unfit for use as has been the case when the fixation is made by welding.

In order to prevent moisture from penetrating into the tubular handle from the outer end of the same, it is advisable to use a similar closing arrangement also at this outer end, whereby also to this outer handle end a pleasing, rounded and closed appearance is given.

I claim:

Means for securing a tubular metal handle to an implement socket, comprising a wooden plug fitting the implement end of the handle and a sealing metal cap for said end shouldering thereon flush therewith and having a portion extending within the said end of the tubular handle, together with wood screws passing through the socket and tube into said wooden plug when the handle is inserted in the socket.

FRIEDRICH STAHL.